(12) United States Patent
Murayama

(10) Patent No.: US 7,916,348 B2
(45) Date of Patent: Mar. 29, 2011

(54) IMAGE FORMING APPARATUS

(75) Inventor: Kentaro Murayama, Kasugai (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 483 days.

(21) Appl. No.: 12/125,708

(22) Filed: May 22, 2008

(65) Prior Publication Data

US 2008/0291477 A1    Nov. 27, 2008

(30) Foreign Application Priority Data

May 25, 2007   (JP) ................... 2007-139071

(51) Int. Cl.
*H04N 1/58* (2006.01)
*G06K 15/00* (2006.01)
*B41J 29/393* (2006.01)
*G03G 15/01* (2006.01)

(52) U.S. Cl. .......... 358/1.9; 358/1.12; 347/19; 399/299; 399/300

(58) Field of Classification Search ............. 358/1.9, 358/1.12; 347/19; 399/299, 300
See application file for complete search history.

(56) References Cited

U.S. PATENT DOCUMENTS

| | | | |
|---|---|---|---|
| 6,930,786 B2 * | 8/2005 | Kataoka et al. | 358/1.12 |
| 7,306,313 B2 * | 12/2007 | Kamimura et al. | 347/19 |
| 2004/0130737 A1 | 7/2004 | Kamimura et al. | |
| 2006/0023761 A1 * | 2/2006 | Moriyama | 372/38.02 |

FOREIGN PATENT DOCUMENTS

JP    2004-061876    2/2004

* cited by examiner

*Primary Examiner* — Charlotte M Baker
(74) *Attorney, Agent, or Firm* — Banner & Witcoff, Ltd.

(57) ABSTRACT

A matched ideal waveform is extracted from a plurality of ideal waveforms based on degree of coincidence with a light sensitive waveform obtained by a light receiving portion. The plurality of ideal waveforms differ from one another in phase. The displacement amount of an image to be formed of an adjustive color from an image to be formed of a reference color is determined based on the extracted matched ideal waveform.

5 Claims, 8 Drawing Sheets

IMAGE FORMING APPARATUS

CROSS REFERENCE TO RELATED APPLICATION

The present application claims priority from Japanese Patent Application No. 2007-139071 filed on May 25, 2007. The entire content of this priority application is incorporated herein by reference.

TECHNICAL FIELD

The present disclosure relates to an image forming apparatus.

BACKGROUND

A tandem type image forming apparatus can include photoconductors, which are provided individually for respective colors (such as black, cyan, magenta and yellow), are arranged along the rotational direction of a paper conveyor belt, so that images of respective colors held on the photoconductors can be sequentially transferred to paper on the belt.

A resultant color image formed by the tandem-type image forming apparatus may include a color shift, due to displacement of images of respective colors from one another. In view of this, some of image forming apparatuses have a function for aligning the forming positions of images of respective colors.

During the alignment function being performed, the image forming apparatus forms, on the belt, a registration pattern (i.e., a pattern used for alignment). The registration pattern includes a plurality of mark pairs, each of which includes a mark of a reference color (e.g., black) and a mark of an adjustive color (e.g. cyan, magenta or yellow). The mark pairs differ from one another in shift amount of the adjustive-color mark from the reference-color mark.

The density of each mark pair depends on the shift amount. Specifically, the density of each mark pair actually formed on the belt depends on the actual shift amount, which includes the above designed shift amount and a displacement amount of the adjustive-color mark from the reference-color mark.

The densities of mark pairs actually formed on the belt are sequentially measured by a density sensor, so that the mark pair having the highest density can be identified. The actual shift amount associated with the identified mark pair can be considered to be zero.

Therefore an amount corresponding to the designed shift amount associated with the identified mark pair can be determined as an estimated displacement amount of an image to be formed of an adjustive color from an image to be formed of a reference color. Then, an image forming position is adjusted so that the estimated displacement amount is canceled.

However, a light sensitive signal, which is outputted from the density sensor and indicates the detected density of an image, may temporarily be affected by noise. In this case, a mark pair not having the highest density may be incorrectly identified as a mark pair having the highest density, due to the noise.

That is, the actual shift amount associated with the identified mark pair may fail to be zero, resulting in inaccuracy of an estimated displacement amount to be determined based on the identified mark pair.

SUMMARY

The image forming apparatus according to an aspect of the invention includes a forming portion, a control portion, a light receiving portion, an extracting portion and a determining portion. The forming portion is configured to form an image on an object based on image data. The object is capable of movement relative to the forming portion.

The control portion is configured to provide data of a pattern as the above image data for the forming portion. The pattern includes a plurality of mark pairs, each of which includes a mark of a reference color and a mark of an adjustive color. The plurality of mark pairs differ from one another in mark shift amount that is a shift amount of the adjustive-color mark from the reference-color mark.

The light receiving portion is configured to receive a light from a detection area, and generate a light sensitive waveform based on an amount of said light that varies with time while said pattern formed on said object moves across said detection area with said relative movement of said object.

The extracting portion is configured to extract a matched ideal waveform from a plurality of ideal waveforms based on degree of coincidence with the light sensitive waveform. The plurality of ideal waveforms differ from one another in phase.

The determining portion is configured to determine, based on the matched ideal waveform, a displacement amount of an image to be formed of the adjustive color from an image to be formed of the reference color.

According to the present invention, a plurality of ideal waveforms having different phases (which can be obtained as light sensitive waveforms by the light receiving portion when noise has not occurred, for example) are provided, so that a matched ideal waveform can be extracted from the plurality of ideal waveforms based on degree of coincidence with the light sensitive waveform.

The displacement amount of an image to be formed of the adjustive color is determined using the matched ideal waveform, instead of the light sensitive waveform. Therefore, even when the light sensitive waveform (obtained by the light receiving portion based on the pattern formed on the object) includes noise, degradation in accuracy of the determined displacement amount due to the noise can be suppressed.

BRIEF DESCRIPTION OF THE DRAWINGS

Illustrative aspects in accordance with the invention will be described in detail with reference to the following drawings wherein.

DETAILED DESCRIPTION

Illustrative Aspect

An illustrative aspect of the present invention will be explained with reference to FIGS. 1 to 8.

(General Construction of Printer)

Figure 1:
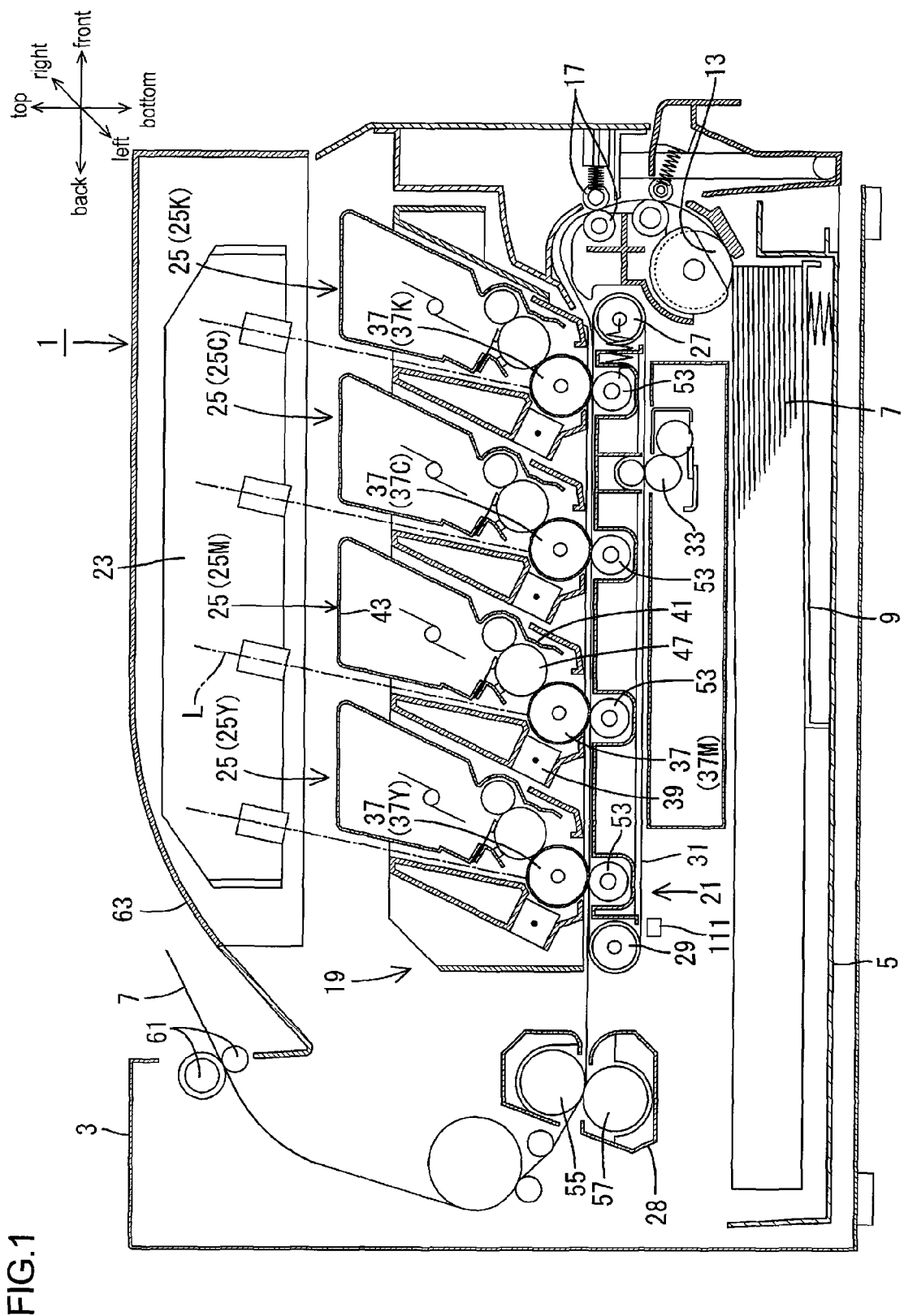
FIG. 1 is a schematic side sectional view of a printer according to an illustrative aspect of the present invention.

FIG. 1 is a schematic sectional side view of a printer 1 according to the present aspect. Hereinafter, the right side of FIG. 1 is referred to as the front side of the printer 1.

The printer 1 (i.e., an example of "an image forming apparatus" of the present invention) is a color laser printer of a direct-transfer tandem type, which has a casing 3 as shown in FIG. 1. A feeder tray 5 is provided on the bottom of the casing 3, and recording media 7 (i.e., sheets such as paper) are stacked on the feeder tray 5.

The recording media 7 are pressed against a pickup roller 13 by a platen 9. The pickup roller 13 forwards the top one of the recording media 7 to registration rollers 17, which forward the recording medium 7 to a belt unit 21 at a predetermined time. If the recording medium 7 is obliquely directed, it is corrected by the registration rollers 17 before forwarded to the belt unit 21.

An image forming section 19 includes the belt unit 21 (as an example of a conveyor means), a scanner unit 23 (as an example of an exposure means), processing units 25, a fixation unit 28 and the like. In the present aspect, the scanner unit 23 and the processing units 25 function as "a forming portion" of the present invention.

The belt unit 21 includes a belt 31 (as an example of "an object" of the present invention), which is disposed between a pair of support rollers 27, 29. The belt 31 is driven by rotation of the backside support roller 29, for example. Thereby, the belt 31 rotates in anticlockwise direction in FIG. 1, so as to convey the recording medium 7 (forwarded thereto) backward.

A cleaning roller 33 is provided below the belt unit 21, in order to remove toner (including toner of a corrective pattern 131 described below), paper dust and the like, which can become attached to the belt 31.

The scanner unit 23 includes laser emitting portions (not shown), which are controlled based on image data of the respective colors so as to switch between ON and OFF. Thereby, the scanner unit 23 performs fast scan by radiating laser beams L from the laser emitting portions to the surfaces of photosensitive drums 37.

The photosensitive drums 37 are individually provided for the respective colors as described below, and laser beams L based on image data of each color is radiated to the corresponding photosensitive drum 37.

The processing units 25 are provided for the respective colors, i.e., black, cyan, magenta and yellow. The processing units 25 have the same construction, but differ in color of toner (as an example of "a colorant"). In FIG. 1, the suffixes K (black), C (Cyan), M (magenta) and Y (Yellow) for indicating colors are attached to symbols of processing units 25 or photosensitive drums 37.

Each processing unit 25 includes a photosensitive drum 37 (as an example of an image carrier or a photoconductor), a charger 39, a developer cartridge 41 and the like. The developer cartridge 41 includes a toner container 43, a developer roller 47 (as an example of "a developer image carrier") and the like. The toner container 43 holds toner therein, which is suitably supplied onto the developer roller 47.

The surface of each photosensitive drum 37 is charged homogeneously and positively by the charger 39, and thereafter exposed to laser beams L from the scanner unit 23 as described above. Thereby, an electrostatic latent image (corresponding to an image of the color to be formed on the recording medium 7) is formed on the surface of the photosensitive drum 37.

Next, the toner on the developer roller 47 is supplied to the surface of the photosensitive drum 37 so as to adhere to the electrostatic latent image. Thus, the electrostatic latent image of each color is visualized as a toner image of the color on the photosensitive drum 37.

While the recording medium 7 (being conveyed by the belt 31) passes between each photosensitive drum 37 and the corresponding transfer roller 53 (as an example of a transfer means), a negative transfer bias is applied to the transfer roller 53. Thereby, the toner images on the respective photosensitive drums 37 are sequentially transferred to the recording medium 7, which is then forwarded to the fixation unit 28.

Using a heating roller 55 and a pressure roller 57, the fixation unit 28 heats the recording medium 7 that has the resultant toner image, while forwarding it. Thereby, the toner image is thermally fixed to the recording medium 7. After passing through the fixation unit 28, the recording medium 7 is ejected onto a catch tray 63 by discharge rollers 61.

(Electrical Configuration of Printer)

Figure 2:
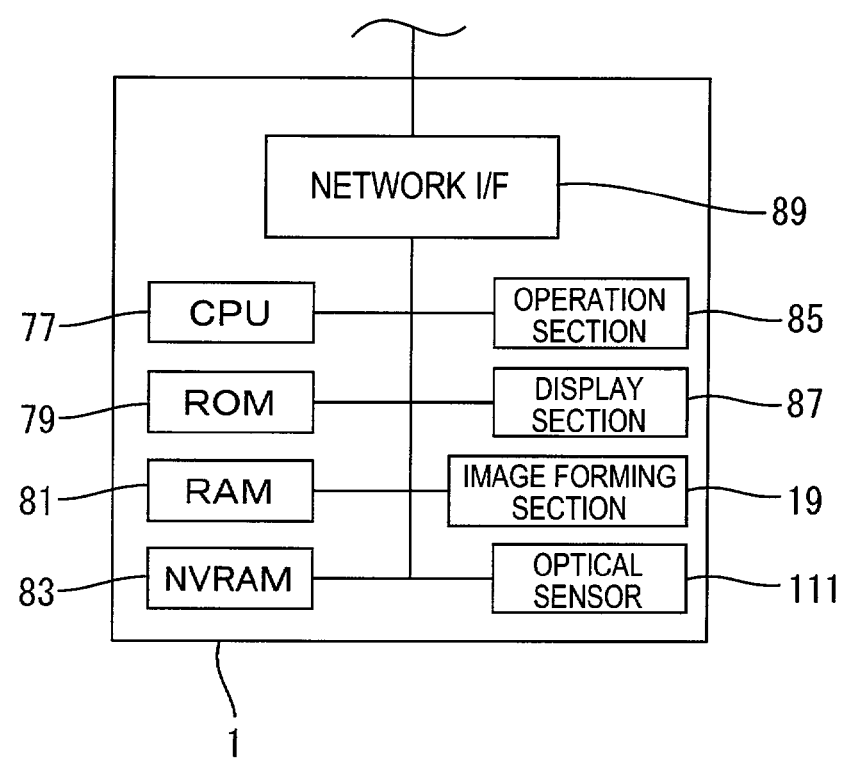
FIG. 2 is a block diagram showing an electrical configuration of the printer.

FIG. 2 is a block diagram showing the electrical configuration of the printer 1. The printer 1 includes a CPU 77, a ROM 79, a RAM 81, an NVRAM 83 (as an example of "a storage portion" of the present invention), an operation section 85, a display section 87, the above-described image forming section 19, a network interface 89, optical sensors 111 and the like.

Various programs for controlling the operation of the printer 1 can be stored in the ROM 79. The CPU 77 controls the operation of the printer 1 based on the programs retrieved from the ROM 79, while storing the processing results in the RAM 81 and/or the NVRAM 83.

The operation section 85 includes a plurality of buttons. Thereby, a user can perform various input operations, such as an operation for a printing request. The display section 87 can include a liquid-crystal display and indicator lamps. Thereby, various setting screens, the operating condition and the like can be displayed. The network interface 89 is connected to an external computer (not shown) or the like, via a communication line (also not shown), in order to enable mutual data communication.

(Color Registration Error Correction)

Color registration is important for a printer capable of forming a color image, such as the present printer 1. This is because a resultant color image may include a color shift if images of respective colors transferred to the recording medium 7 fail to be aligned due to color registration errors. Therefore, color registration error correction (i.e., displacement correction) is performed in order to prevent a color shift.

During a displacement correction process being performed, the CPU 77 of the printer 1 retrieves the data of a corrective pattern 131 (shown in FIG. 3) from the NVRAM 83, for example, and provides the retrieved data as image data for the image forming section 19. Thus, the CPU 77 functions as "a control portion" of the present invention. The image forming section 19 forms the corrective pattern 131 on the surface of the belt 31, as shown in FIG. 3.

Figure 3:
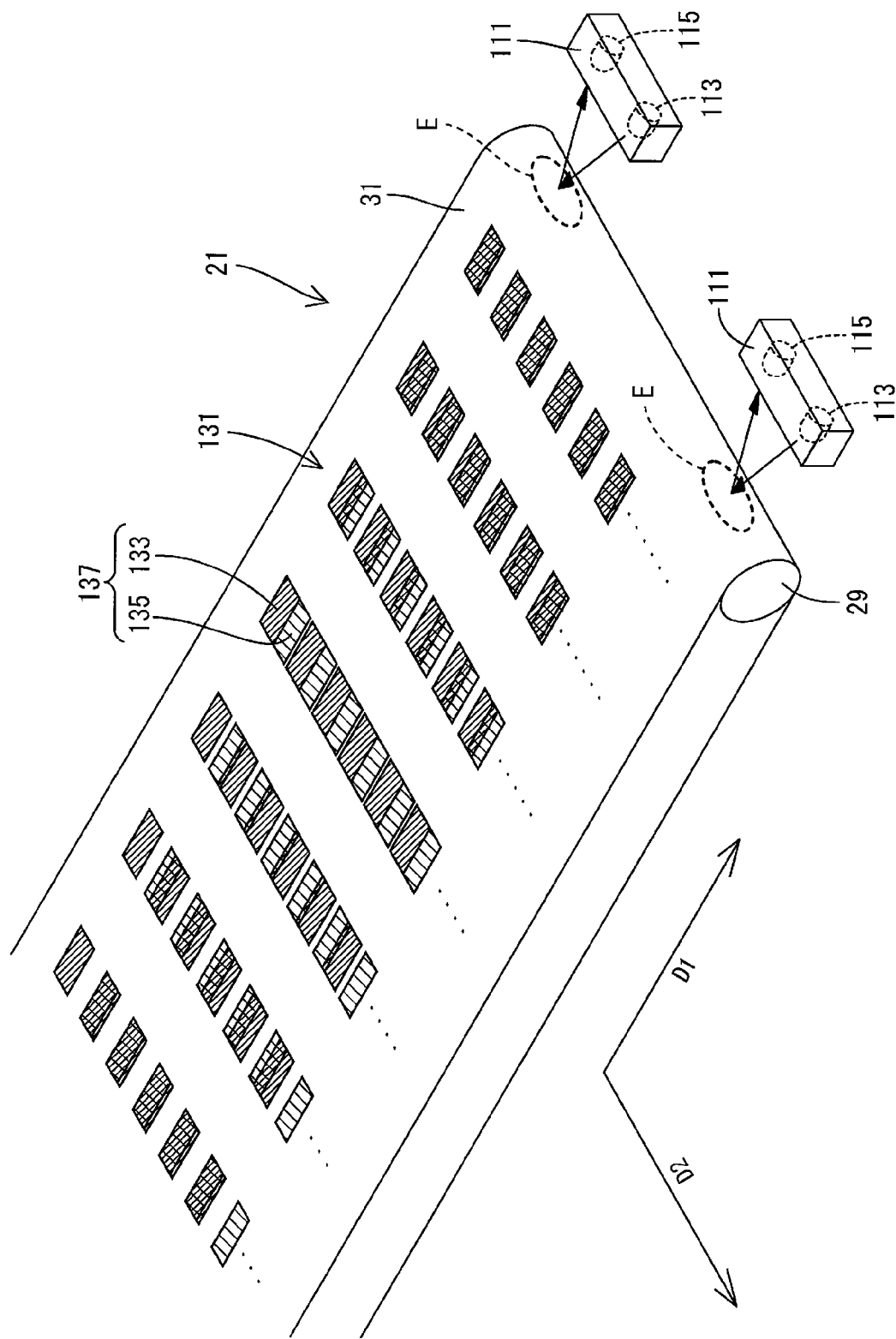
FIG. 3 is a perspective view of optical sensors and a belt.

The corrective pattern 131 shown in FIG. 3 is an example of a registration pattern used for detecting a displacement amount of an image of an adjustive color (e.g. cyan, magenta or yellow) from an image of a reference color (e.g. black) in the main scanning direction D2. Thereby, in the present aspect, displacement correction in the main scanning direction D2 is performed as follows.

The CPU 77 measures the displacement amount of an adjustive-color image from a reference-color image by the optical sensors 111 (described below). More specifically, the CPU 77 determines the displacement amount based on the level of light, which is received by the optical sensors 111 during detection of the corrective pattern 131.

Using the determined displacement amount, the laser scanning position is corrected so that the displacement is canceled. The laser scanning position means the position on each photosensitive drum 37 where the laser beams L are radiated at, which can be changed for displacement correction by adjusting the timing of emission of laser beams L from the scanner unit 23.

The CPU 77 initiates execution of the above-described displacement correction process at a predetermined time. For example, the displacement correction process is started when the elapsed time or the number of printed recording media since previous execution of the displacement correction process reaches a predetermined reference value.

Hereinafter, the color registration error correction (displacement correction) will be explained in more detail, concentrating on how to determine the displacement amount.

1. Optical Sensors

One or a plurality (e.g., two in the present aspect) of optical sensors 111 are provided below the backside portion of the belt unit 21, as shown in FIG. 3. The two optical sensors 111 are arranged along the right-to-left direction. Each of the optical sensors 111 is a reflective sensor that includes a light emitting element 113 (e.g., an LED) and a light receiving element 115 (e.g., a phototransistor).

Specifically, the light emitting element 113 radiates light obliquely to the surface of the belt 31, while the light receiving element 115 receives the light reflected by the surface of the belt 31. The spot area on the belt 31 defined by light from the light emitting element 113 corresponds to the detection area E of the optical sensor 111. The light receiving element 115 is an example of "a light receiving portion" of the present invention.

Figure 4:
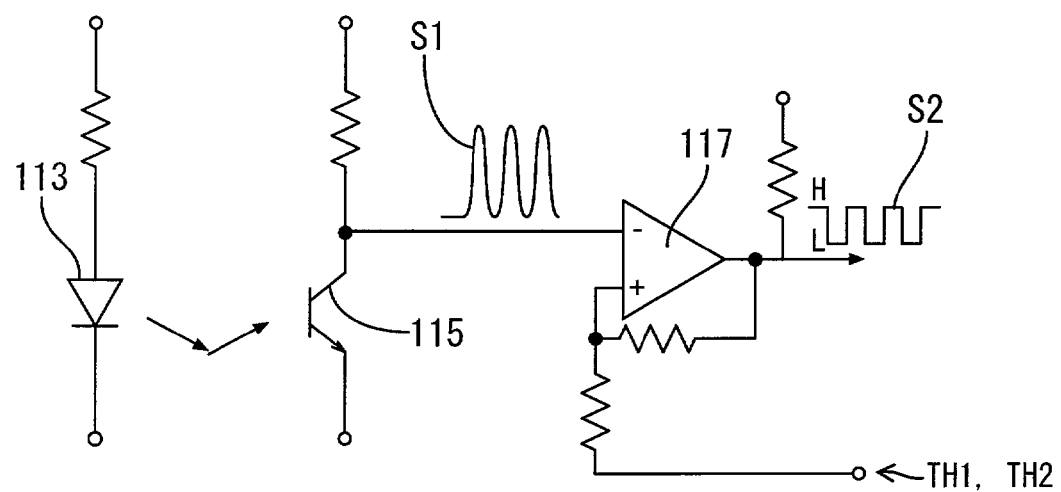
FIG. 4 is a circuit diagram of the optical sensor.

FIG. 4 is a circuit diagram of the optical sensor 111. The light receiving element 115 provides a light sensitive signal S1 according to an amount of light received from the detection area E. In the present aspect, the level of a light sensitive signal S1 is lower when the level of a light amount received by the light receiving element 115 is higher, and is higher when the level of a received light amount is lower.

In the present aspect, the reflectivity of the belt 31 is higher than that of an image formed area. That is, the reflectivity of an exposed area of the belt 31 is higher than that of an area occupied by marks (described below) of a corrective pattern 131. Therefore, the level of a light sensitive signal S1 is lower when the detection area E includes a larger exposed area of the belt 31, and is higher when the detection area E includes a larger mark-formed area of the belt 31, as described below.

The light sensitive signal S1 is inputted to a hysteresis comparator 117 (as an example of a comparator circuit). The hysteresis comparator 117 compares the level of the light sensitive signal S1 with thresholds (i.e., a first threshold TH1 and a second threshold TH2), so as to output a binary signal S2 which is level-inverted based on the result of the comparison.

Specifically, in the present aspect, the binary signal S2 is low level before the level of the light sensitive signal S1 falls below the second threshold TH2 after exceeding the first threshold TH1. Otherwise, it is high level.

2. Corrective Pattern of the Present Aspect

Figure 5:
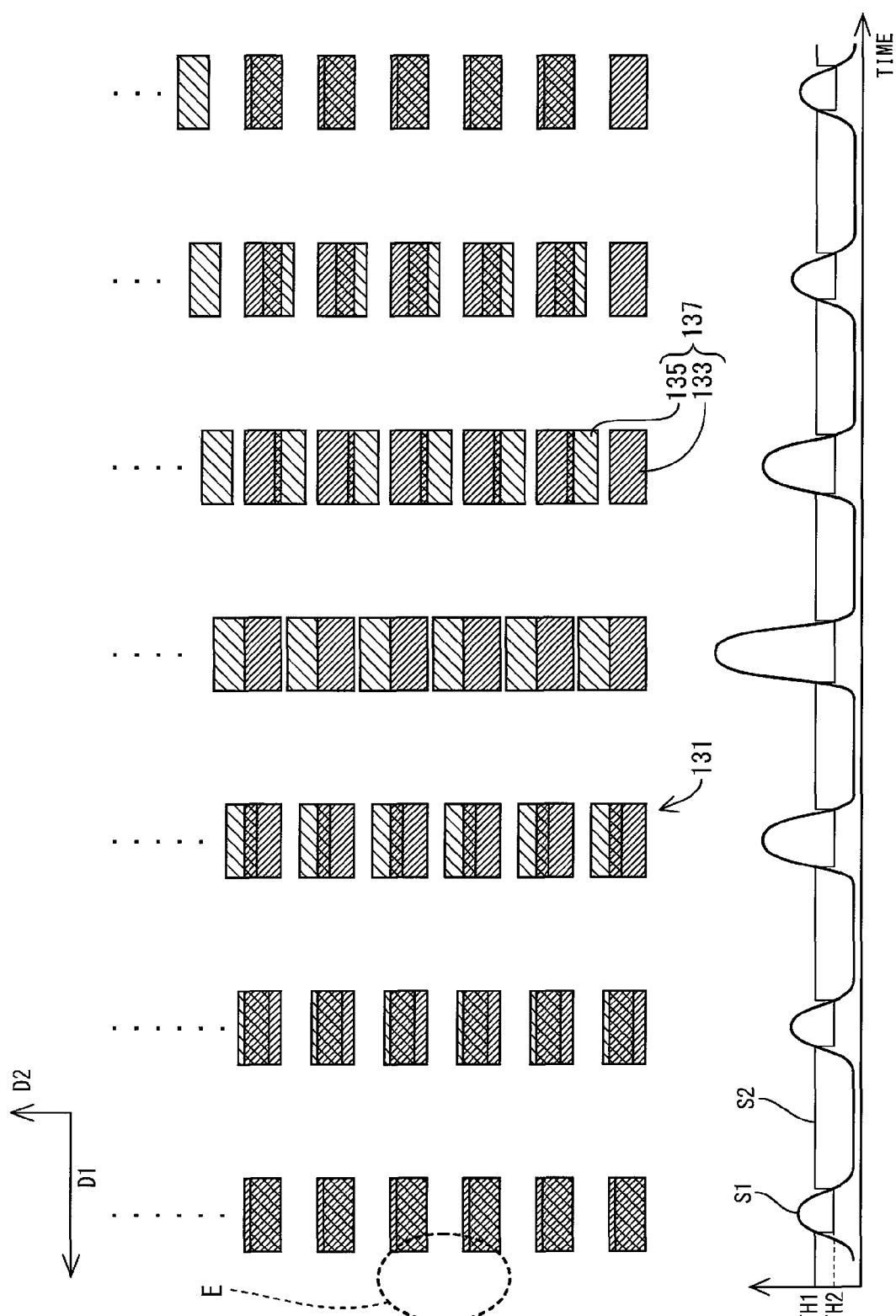
FIG. 5 is a schematic diagram showing a corrective pattern, accompanied by a signal waveform diagram of a light sensitive signal.

Referring to FIG. 5, a corrective pattern 131 includes mark pairs 137, each of which includes a mark 133 of a reference color and a mark 135 of an adjustive color. In the present aspect, the reference color is an achromatic color (i.e., black), while the adjustive color is a chromatic color (i.e., cyan, magenta or yellow), as described above.

The reference-color mark 133 acts as a reference for displacement correction, so that the position of an image to be formed of the adjustive color can be corrected with respect to the position of an image to be formed of the reference color.

The mark pairs 137 are arranged in an array of rows and columns, i.e., arranged in the secondary scanning direction D1 and the main scanning direction D2, as shown in FIG. 5. The mark pairs 137 arranged in a row (i.e., arranged in the secondary scanning direction D1) differ from one another in shift amount of the adjustive-color mark 135 from the reference-color mark 133 (hereinafter, referred to as "a mark shift amount"). In contrast, the mark shift amount is the same in the mark pairs 137 arranged in a column.

In the present aspect, the mark shift amount is the smallest on the first-printed side of a row of the mark pairs 137, and gets larger at the last-printed side, as shown in FIG. 5. Consequently, the overlap between the reference-color mark 133 and the adjustive-color mark 135 is the largest on the first-printed and last-printed sides of a row, and the smallest right at the middle of the row.

The difference between the mark shift amounts of adjacent mark pairs 137 (i.e., the minimal difference between the mark shift amounts of two mark pairs 137) is set to be constant (e.g., a value corresponding to two dots) over the entire row, in the present aspect. However, the difference need not necessarily be uniform over the entire row.

Further, in the present aspect, the reference-color mark 133 and the adjustive-color mark 135 of each mark pair 137 differ from each other in the width (i.e., in the length in the main scanning direction D2). The difference in width corresponds to one dot, for example.

3. Determination of Displacement Amount

Figure 6:
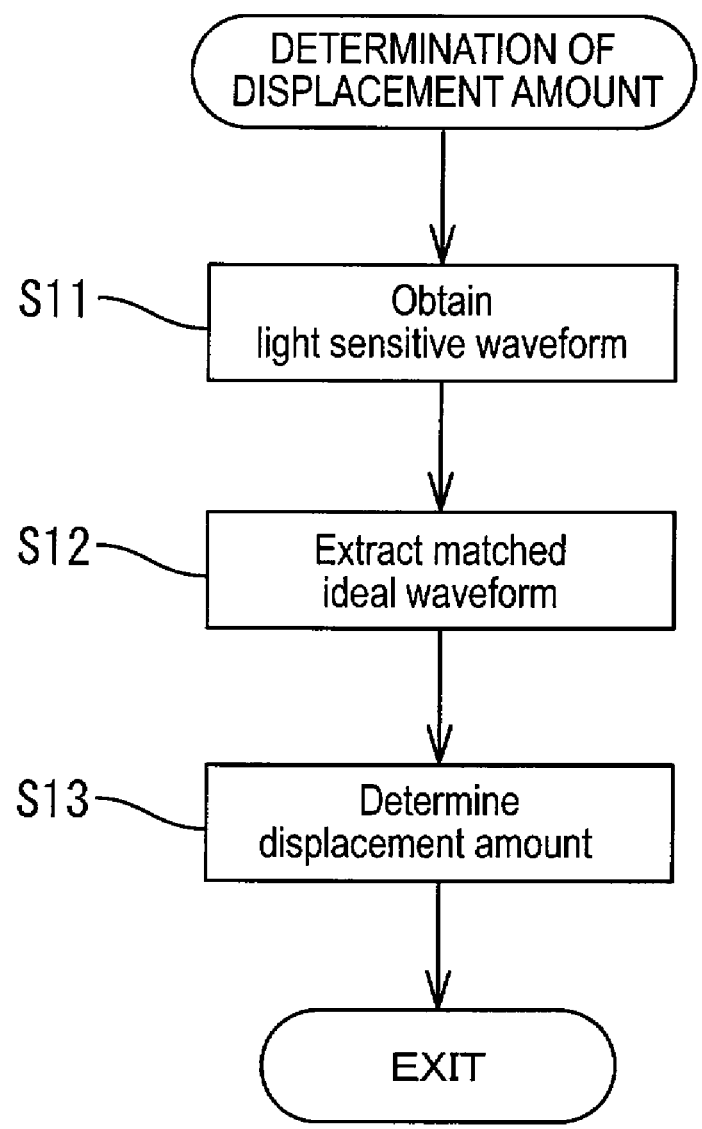
FIG. 6 is a flowchart of a process for determination of a displacement amount.

FIG. 6 shows a process for determination of a displacement amount based on a corrective pattern 131. The CPU 77 obtains a light sensitive waveform (shown as Graph W1 in FIG. 7) at step S11 based on binary signals S2 from the optical sensors 111 while causing the image forming section 19 to form a corrective pattern 131 on the belt 31. Hereinafter, the light sensitive waveform obtained at step S11 is referred to as "a sampled light sensitive waveform W1".

Note that the light amount reflected from each detection area E depends on the area of overlap between the reference-color mark 133 and the adjustive-color mark 135 of a mark pair 137 present in the detection area E.

That is, when the overlap is large, the exposed area of the belt 31 is large and therefore the light amount reflected from the detection area E is large. Therefore, in this case, the level of a light sensitive signal S1 is low as described above, and the pulse width of the binary signal S2 is small as shown in FIG. 5.

The pulse width (i.e., an example of "a signal characteristic value" of the present invention) of the binary signal S2 is a duration of the binary signal S2 being low level, which corresponds to a length of time before the light sensitive signal S1 falls below the second threshold TH2 after exceeding the first threshold TH1, as described above.

On the other hand, when the overlap between the reference-color mark 133 and the adjustive-color mark 135 of a mark pair 137 present in the detection area E is small, the exposed area of the belt 31 is small and therefore the light amount reflected from the detection area E is small. Therefore, in this case, the level of the light sensitive signal S1 is high as described above, and the pulse width of the binary signal S2 is large as shown in FIG. 5.

At step S11, the CPU 77 obtains the above-described sampled light sensitive waveform W1 based on the pulse widths of the binary signals S2, which correspond to the areas of overlaps as described above. Specifically, the sampled light sensitive waveform W1 can be obtained based on the average of the pulse widths of the binary signals S2 from the two optical sensors 111.

Next, at step S12, a matched ideal waveform W2' (shown in FIG. 7) is extracted from a plurality of ideal waveforms W2 stored in the NVRAM 83. That is, an ideal waveform most approximate to the sampled light sensitive waveform W1 (obtained at step S11) is extracted from the ideal waveforms W2. The ideal waveforms W2 are ideal light sensitive waveforms, which are free from effect of noise or the like.

The ideal waveforms W2 can be obtained by modifying a sampled light sensitive waveform obtained beforehand (preferably when noise has not occurred), for example. The obtained ideal waveforms W2 are stored as two-dimensional data (i.e., data in the coordinate system having a pulse-width scale and a time scale as axes) in the NVRAM 83.

The plurality of ideal waveforms W2 have different phases, i.e., they are time-shifted from one another. The phase difference $\Delta T1$ (shown in the lower graph of FIG. 7) between two adjacent ideal waveforms W2 is set to be smaller than the sampling interval $\Delta T2$ of the sampled light sensitive waveform W1 (i.e., the time interval between two adjacent data points in the upper graph of FIG. 7). Thereby, the displacement amount can be determined in a unit smaller than the minimal difference between the mark shift amounts, as described below.

The NVRAM 83 further stores a data table (i.e., an example of relation information) that shows a correspondence relation between ideal waveforms and displacement amounts. Each of the displacement amounts in the data table indicates an estimated displacement amount of an image of the adjustive color in the main scanning direction D2, which can be associated with a corresponding one of the ideal waveforms W2.

That is, an ideal waveform W2, which is most approximate to a sampled light sensitive waveform obtained when reference-color marks 133 and adjustive-color marks 135 are formed without color registration error, is set as a reference ideal waveform, and the displacement amount corresponding thereto is set to zero. As for the other ideal waveforms W2, the displacement amounts corresponding thereto are set based on the phase differences between the ideal waveforms and the reference ideal waveform.

Alternatively, the NVRAM 83 may store the correspondence relation as a formula indicating the relationship between the phases of ideal waveforms W2 and the displacement amounts, instead of the data table. In this case, the estimated displacement amount can be calculated using the formula based on the phase of an ideal waveform W2 selected as a matched ideal waveform W2'.

Returning to FIG. 6, at step S12, a matched ideal waveform W2' as an ideal waveform W2 approximate to the sampled light sensitive waveform W1 (obtained at step S11) is extracted from the plurality of ideal waveforms W2 as described above, based on degree of coincidence with the sampled light sensitive waveform W1. Specifically, in the present aspect, an inner product method is used for the extraction as follows.

Assuming that (P1, t1) represents a coordinate value of the sampled light sensitive waveform W1 while (Px, tx) represents a coordinate value of the ideal waveforms W2 (where "P1" and "Px" are values on the pulse-width scale, "t1" and "tx" are values on the time scale, and "x" represents the identification number of each ideal waveform W2), the CPU 77 calculates $\Sigma(P1 \cdot Px + t1 \cdot tx)$ for each ideal waveform W2.

That is, for each ideal waveform W2, the CPU 77 calculates the sum total of inner products of the data points on the sampled light sensitive waveform W1 and the corresponding data points on the ideal waveform W2. Each sum total is calculated using data of the sampled light sensitive waveform W1 within a cycle thereof. If the sum total calculated for an ideal waveform W2 is large, it can be determined that the degree of coincidence between the ideal waveform W2 and the sampled light sensitive waveform W1 is high.

Figure 7:
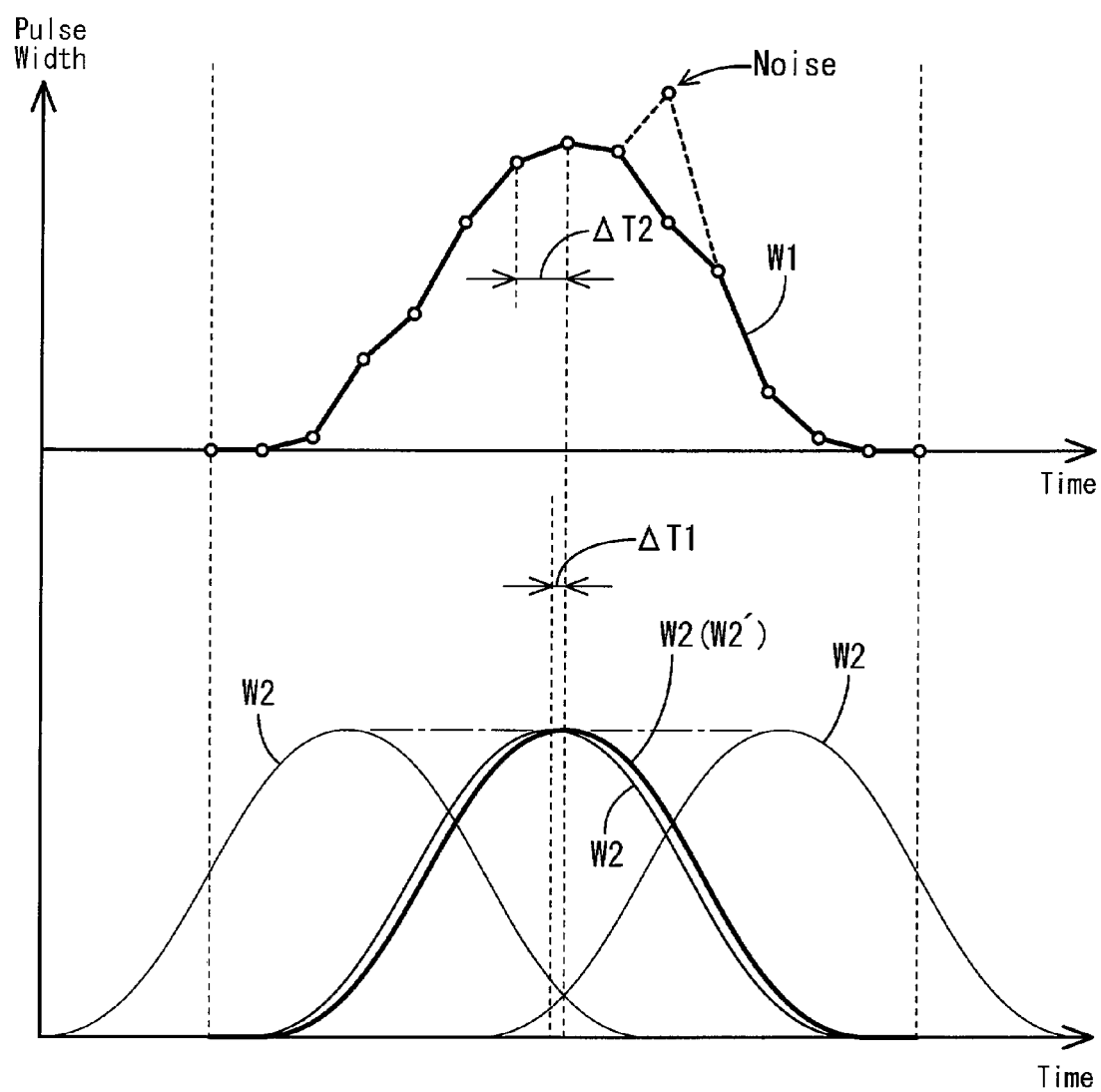
FIG. 7 is a graph showing a sampled light sensitive waveform and ideal waveforms.

In the present aspect, an ideal waveform W2 corresponding to the largest sum total is extracted as a matched ideal waveform W2' (shown by a heavy line in the lower graph of FIG. 7). The CPU 77 executing step S12 functions as "an extracting portion" of the present invention.

Next, at step S13, the CPU 77 determines the displacement amount of the adjustive-color marks 135 from the reference-color marks 133, using the matched ideal waveform W2', as follows.

When the reference-color marks 133 and the adjustive-color marks 135 are formed without color registration error (as shown in FIG. 5), the above-described reference ideal waveform W2 is extracted as a matched ideal waveform W2' at step S12, and therefore "zero" as the displacement amount corresponding thereto is retrieved from the data table in the NVRAM 83 and determined as the displacement amount of the adjustive-color marks 135 at step S13.

On the other hand, when the reference-color marks 133 and the adjustive-color marks 135 are formed so as to be displaced from each other in the main scanning direction D2 due to color registration error (i.e., when the column of the corrective pattern 131, on which the overlaps between the reference-color marks 133 and the adjustive-color marks 135 are the largest, is shifted from that shown in FIG. 5), the phase of the sampled light sensitive waveform W1 shifts from that of the reference ideal waveform W2.

That is, an ideal waveform W2 other than the reference ideal waveform W2 is extracted as a matched ideal waveform W2' at step S12, and therefore the displacement amount corresponding thereto (i.e., a value not equal to zero) is retrieved from the data table in the NVRAM 83 and determined as the displacement amount of the adjustive color marks 135 at step S13. The CPU 77 executing step S13 functions as "a determining portion" of the present invention.

Note that the minimal phase difference $\Delta T1$ between the ideal waveforms W2 is smaller than the sampling interval $\Delta T2$ of the sampled light sensitive waveform W1, as described above. Therefore, the minimal difference between displacement amounts corresponding to the ideal waveforms W2 is smaller than the minimal difference between mark shift amounts of the mark pairs 137. Thereby, the displacement amount can be determined at step S13 in a unit smaller than the minimal difference between the mark shift amounts.

In future operations for image formation, the position of an image of the adjustive color on a recording medium 7 is corrected based on the displacement amount determined at step S13, so that the displacement in the main scanning direction D2 can be canceled. Specifically, when the scanner unit 23 emits laser beams L for forming images of the adjustive color, timing of the emission is adjusted based on the determined displacement amount, as described above.

In the present aspect, for each of the three chromatic colors, a corrective pattern 131 including reference-color marks 135 of the achromatic color and adjustive-color marks 135 of the chromatic color is formed on the belt 31 and a process for determination of a displacement amount (described above) is executed. That is, displacement amounts are determined individually for the respective chromatic colors.

In the present aspect, a plurality of ideal waveforms W2 are provided individually for different chromatic colors. That is, the ideal waveforms W2 stored in the NVRAM 83 are different for different adjustive colors. This is because a sampled light sensitive waveform W1 obtained using the optical sensors 111 differs depending on the color.

For example, referring to FIG. 1, an image of cyan is formed by the processing unit 25C disposed on the upstream side. Therefore, reference-color marks 133 of black and adjustive-color marks 135 of cyan (or specifically, the whole or edges thereof) are slightly extended while passing between the downstream-side photosensitive drums 37M, 37Y and the corresponding transfer rollers 53.

Figure 8:
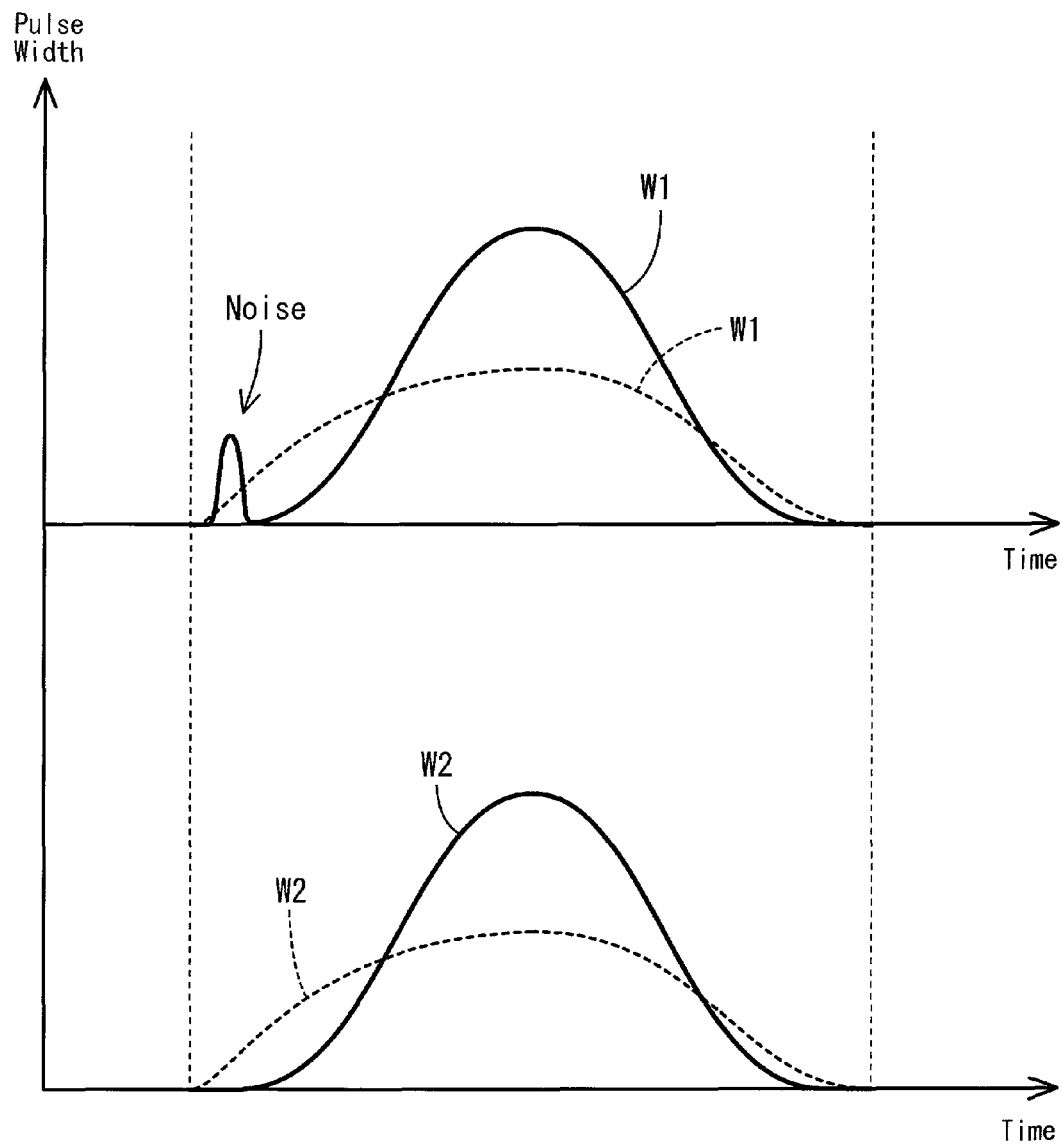
FIG. 8 is a graph showing sampled light sensitive waveforms associated with two respective adjustive colors, and further showing ideal waveforms prepared for the two respective adjustive colors.

Thereby, a sampled light sensitive waveform W1 obtained based on a corrective pattern 131 including reference-color marks 133 of black and adjustive-color marks 135 of cyan is small in height and large in width, as shown by a dotted line in the upper graph of FIG. 8.

In contrast, a sampled light sensitive waveform W1 obtained based on a corrective pattern 131 including reference-color marks 133 of black and adjustive-color marks 135 of magenta or yellow is large in height and small in width, as shown by a solid line in the upper graph of FIG. 8.

If an ideal waveform W2 having a small height for cyan (as shown by a dotted line in the lower graph of FIG. 8) is used indifferently for determining the displacement amount based on a corrective pattern 131 including adjustive-color marks 135 of magenta, inner products calculated at step S12 are susceptible to noise that can be included in the sampled light sensitive waveform W1 (as shown in the upper graph of FIG. 8).

Therefore, an ideal waveform W2 having the same phase as the sampled light sensitive waveform W1 may fail to be extracted as a matched ideal waveform W2' at step S12. That is, an ideal waveform W2 having a different phase from the sampled light sensitive waveform W1 may be extracted incorrectly. For this reason, different ideal waveforms W2 are prepared for different colors in the present aspect.

Thus, in the present aspect, displacement amounts are determined individually for the respective chromatic colors, and thereby displacement correction for the chromatic colors is performed using the respective displacement amounts.

However, alternatively, displacement correction may be performed for all the three chromatic colors commonly using the displacement amount determined by a displacement amount determination process executed for one of the chromatic colors.

(Effect of the Present Illustrative Aspect)

In the present aspect, a matched ideal waveform W2' is extracted from the plurality of ideal waveforms W2 based on degree of coincidence with the sampled light sensitive waveform W1, so that the displacement amount of an image to be formed of the adjustive color can be determined based on the matched ideal waveform W2', instead of the sampled light sensitive waveform W1. Thereby, even when the sampled light sensitive waveform W1 includes noise as shown by a dotted line in the upper graph of FIG. 7, the effect of the noise can be suppressed.

In the present aspect, optical sensors 111 are used for obtaining the binary signals S2, and the sampled light sensitive waveform W1 is generated based on the pulse widths of the binary signals S2. Instead of optical sensors 111, a density sensor can be used for sampling the peak value of a light amount reflected from the detection area E, and thereby a waveform based on the peak values may be generated as a sampled light sensitive waveform.

However, a density sensor capable of detecting the peak value of a received light amount is more expensive, compared to optical sensors 111. According to the present aspect, acquisition of a sampled light sensitive waveform W1 can be achieved using optical sensors 111, which are relatively inexpensive.

In the case of a conventional construction wherein a displacement amount is estimated directly based on the values measured from a corrective pattern 131 (without using the ideal waveforms), the displacement amount can be determined in a unit corresponding to the minimal difference between mark shift amounts. Therefore, the difference between the mark shift amounts of adjacent mark pairs 137 should be set to be smaller (i.e., a larger number of marks should be formed as a corrective pattern 131) in order to determine the displacement amount in higher precision.

In contrast, according to the present aspect, a displacement amount is estimated based on a matched ideal waveform W2', which is extracted from the plurality of ideal waveforms W2 by comparison with the sampled light sensitive waveform W1. Therefore, the precision of determination of a displacement amount can be increased by setting the phase difference ΔT1 to a smaller value (i.e., by increasing the number of ideal waveforms W2 used for comparison), without increasing a number of marks 133, 135 to be formed.

In the present aspect, the phase difference ΔT1 is set to be smaller than the sampling interval ΔT2, and thereby the displacement amount can be determined in a unit smaller than the minimal difference between the mark shift amounts. A desired precision can be achieved by setting the phase difference ΔT1 to a value corresponding to the desired precision.

<Other Illustrative Aspects>

The present invention is not limited to the illustrative aspect explained in the above description made with reference to the drawings. The following aspects may be included in the technical scope of the present invention, for example.

(1) In the above aspect, the reflectivity of the belt 31 (as an object) is higher than that of an image formed area. However, conversely, the reflectivity of the belt 31 may be lower than that of an image formed area.

In this case, when the detection area E includes a larger exposed area of the belt 31, a light amount reflected from the detection area E is lower, and therefore the level of a light sensitive signal S1 is higher. When the detection area E includes a larger mark-formed area of the belt 31, a light amount reflected from the detection area E is higher, and therefore the level of a light sensitive signal S1 is lower.

Accordingly, each of the pulse widths of binary signals S2, based on which a sampled light sensitive waveform W1 is obtained, corresponds to a length of time before the light sensitive signal S1 exceeds the first threshold TH1 after falling below the second threshold TH2, in this case.

(2) In the above aspect, the difference between mark shift amounts of adjacent mark pairs 137 is set to a value corresponding to two dots as an example. However, that may be appropriately set so that a sampled light sensitive waveform W1 can be obtained. For example, the difference may be set to a value corresponding to one dot. Further, the difference need not necessarily be uniform over a row of a corrective pattern 131, as described above.

(3) In the above aspect, the displacement amount determined at step S13 is automatically used for correcting the displacement (i.e., used for adjusting the timing of emission of laser beams L from the scanner unit 23).

However, the present invention is not limited to this construction, but rather may be a construction in which correction of displacement is not automatically performed. In this construction, when the determined displacement amount exceeds a predetermined value, the CPU 77 may inform a user about that by the display section 87 of the printer 1, for example.

(4) In the above aspect, a color laser printer of a direct-transfer type is shown as an image forming apparatus. However, the present invention can be applied to other types of image forming apparatuses such as a laser printer of an intermediate-transfer type or an ink-jet printer. Further, the present invention may be applied to a printer that uses colorants of two or three colors, or colorants of five or more colors.

(5) In the above aspect, the marks of a corrective pattern 131 formed on the paper conveyer belt 31 (as an object) are detected for obtaining a light sensitive signal S1. However, instead of the belt 31, a corrective pattern 131 may be formed on a recording medium 7 (i.e., an example of "an object" of the present invention) such as paper or an OHP sheet to be conveyed by the belt 31.

Further, in the case of a printer of an intermediate-transfer type having an intermediate-transfer belt onto which a developer image on a photosensitive drum (as an image carrier) is directly transferred, the marks 133, 135 of a corrective pattern 131 as an image on the intermediate-transfer belt (i.e., an example of "an object" of the present invention) may be detected for obtaining a light sensitive signal S1.

(6) In the above aspect, marks of an achromatic color (i.e., black) are formed as reference-color marks 133 while marks of a chromatic color are formed as adjustive-color marks 135. This construction is sometimes preferable, because the reflectivities of the chromatic colors are approximate to one another but substantially different from that of the achromatic color.

However, the present invention is not limited to this construction. For example, the marks of a chromatic color may be formed as reference-color marks.

(7) In the above aspect, the sum total of inner products of the data points on the sampled light sensitive waveform W1 and the corresponding data points on each ideal waveform W2 is calculated, and one ideal waveform corresponding to the largest sum total is extracted as a matched ideal waveform W2'. However, the present invention is not limited to this construction.

For example, a plurality of ideal waveforms W2 corresponding to top sum totals may be extracted as matched ideal waveforms W2'. In this case, the average of displacement amounts corresponding to the plurality of matched ideal waveforms W2' can be determined at step S13 as the displacement amount of an image to be formed of the adjustive color.

(8) In the above aspect, the displacement amount in the main scanning direction D2 is determined using a corrective pattern 131 including reference-color marks 133 and adjustive-color marks 135 which are shifted from each other by different shift amounts in the main scanning direction D2. However, the present invention is not limited to this construction.

Alternatively or additionally, the displacement amount in the secondary scanning direction D1 may be determined using a corrective pattern including reference-color marks and adjustive-color marks which are shifted from each other by different shift amounts in the secondary scanning direction D1.

What is claimed is:

1. An image forming apparatus comprising:
   a forming portion configured to form an image on an object based on image data, said object being capable of movement relative to said forming portion;
   a processor configured to execute instructions, the instructions including:
      a control portion configured to provide data of a pattern as said image data for said forming portion, said pattern including a plurality of mark pairs, each of said plurality of mark pairs including a mark of a reference color and a mark of an adjustive color, said plurality of mark pairs differing from one another in mark shift amount that is a shift amount of said adjustive-color mark from said reference-color mark;
   a light receiving portion configured to receive a light from a detection area, and generate a light sensitive waveform based on an amount of said light that varies with time while said pattern formed on said object moves across said detection area with said relative movement of said object;
   said processor configured to execute additional instructions including:
      an extracting portion configured to extract a matched ideal waveform from a plurality of ideal waveforms based on degree of coincidence with said light sensitive waveform, said plurality of ideal waveforms differing from one another in phase; and
      a determining portion configured to determine, based on said matched ideal waveform, a displacement amount of an image to be formed of said adjustive color from an image to be formed of said reference color.

2. An image forming apparatus as in claim 1, further comprising:
   a storage portion configured to store relation information that shows a correspondence relation between said plurality of ideal waveforms and a plurality of displacement amounts, each of said plurality of displacement amounts corresponding to a phase of a corresponding one of said plurality of ideal waveforms;
   wherein execution of said determining portion determines, based on said relation information, a displacement amount corresponding to said matched ideal waveform as said displacement amount of an image to be formed of said adjustive color.

3. An image forming apparatus as in claim 1, wherein:
   a displacement amount corresponds to a phase of each of said plurality of ideal waveforms; and
   a minimal difference between displacement amounts corresponding to phases of said plurality of ideal waveforms is smaller than a minimal difference between mark shift amounts of said plurality of mark pairs.

4. An image forming apparatus as in claim 1, wherein:
   said light receiving portion generates said light sensitive waveform by sampling a signal characteristic value from a light sensitive signal that indicates said time-varying amount of light; and
   said signal characteristic value is a time length determined by comparing a time-varying value of said light sensitive signal with at least one threshold while said pattern formed on said object moves across said detection area with said relative movement of said object.

5. An image forming apparatus as in claim 1, wherein:
   execution of said control portion causes said forming portion to form an image of said pattern individually for each of a plurality of adjustive colors; and
   said plurality of ideal waveforms are provided individually for different adjustive colors, so as to have different shapes for different adjustive colors.

* * * * *